US009305412B2

(12) United States Patent
Winkelman

(10) Patent No.: US 9,305,412 B2
(45) Date of Patent: Apr. 5, 2016

(54) APPARATUS, SYSTEM AND METHOD FOR VEHICLE AUTHENTICATION MANAGEMENT AND REPORTING

(71) Applicants: VOLKSWAGEN AG, Wolfsburg (DE); AUDI AG, Ingolstadt (DE)

(72) Inventor: Dominic Winkelman, San Mateo, CA (US)

(73) Assignees: VOLKSWAGEN AG, Wolfsburg (DE); AUDI AG, Ingolstadt (DE)

( * ) Notice: Subject to any disclaimer, the term of this patent is extended or adjusted under 35 U.S.C. 154(b) by 203 days.

(21) Appl. No.: 14/087,546

(22) Filed: Nov. 22, 2013

(65) Prior Publication Data
US 2015/0145648 A1    May 28, 2015

(51) Int. Cl.
G07C 9/00     (2006.01)
B60R 25/24    (2013.01)

(52) U.S. Cl.
CPC ............ *G07C 9/00309* (2013.01); *B60R 25/24* (2013.01); *G07C 9/00571* (2013.01); *G07C 2009/00388* (2013.01); *G07C 2009/00793* (2013.01)

(58) Field of Classification Search
USPC ....................................................... 340/5.72
See application file for complete search history.

(56) References Cited

U.S. PATENT DOCUMENTS

| 5,257,407 | A | * | 10/1993 | Heinzelmann | ......... H04B 17/20 455/226.1 |
| 5,519,260 | A | * | 5/1996 | Washington | ............ B60R 25/04 123/198 DC |
| 5,715,905 | A | * | 2/1998 | Kaman | ................... B60R 25/20 180/287 |
| 6,112,152 | A | * | 8/2000 | Tuttle | ................... G07B 15/063 340/5.61 |
| 6,323,761 | B1 | * | 11/2001 | Son | ......................... B60R 25/10 340/426.35 |
| 6,549,130 | B1 | * | 4/2003 | Joao | ...................... B60R 25/018 307/10.2 |
| 6,870,458 | B2 | * | 3/2005 | Caren | ..................... B60R 25/24 307/10.3 |
| 7,248,151 | B2 | | 7/2007 | Mc Call | |
| 7,397,363 | B2 | * | 7/2008 | Joao | ...................... B60R 25/102 307/10.2 |
| 7,688,197 | B2 | * | 3/2010 | Becker | .................. G01C 21/26 340/426.19 |
| 7,808,371 | B2 | * | 10/2010 | Blanchet | ............. B60R 25/1004 340/426.1 |
| 8,120,467 | B2 | * | 2/2012 | Ehrman | .................. G06Q 10/08 340/10.1 |
| 8,548,645 | B2 | | 10/2013 | Long | |
| 8,660,709 | B2 | * | 2/2014 | Harvey | ............... B60R 25/1003 340/425.5 |
| 2011/0215921 | A1 | | 9/2011 | Ben Ayed et al. | |
| 2013/0259232 | A1 | | 10/2013 | Petel | |
| 2014/0303837 | A1 | * | 10/2014 | Tuukkanen | ............ G06Q 10/02 701/36 |

FOREIGN PATENT DOCUMENTS

EP    0950784 B1    11/2005
EP    2530962 A1    12/2012

* cited by examiner

*Primary Examiner* — Brian Miller
(74) *Attorney, Agent, or Firm* — Barnes & Thornburg LLP

(57) ABSTRACT

Apparatus, system and method for authenticating access to a vehicle, where vehicle events, such as a door lock condition or an operating condition of the vehicle, are reported to an authentication network. Vehicle events are compared to a vehicle schedule to determine if the vehicle events comply with the schedule using authentication rules. If the events are not compliant, an authentication request signal, requiring a predetermined authentication response, is transmitted to the vehicle. Access to the vehicle may be denied until a match to the predetermined authentication response is received. Authentication may include the use of a portable device, which may act as an intermediary between the vehicle and the authentication system. Vehicle events may further be reported to the portable device. Authentication rules may be updated automatically based on further incoming vehicle events, or may be updated manually using a computer.

14 Claims, 7 Drawing Sheets

APPARATUS, SYSTEM AND METHOD FOR VEHICLE AUTHENTICATION MANAGEMENT AND REPORTING

TECHNICAL FIELD

The present disclosure is directed to vehicle authentication management and feedback. More specifically, the present disclosure is directed to pairing users with their automobiles using portable devices in order to report and receive acknowledgments of vehicle event data via an authentication system. The authentication system is configured to receive process and update vehicle event data to establish an authentication schedule for a vehicle (sometimes referred to herein as a vehicle "event schedule"). The authentication system may also be updated by users to modify the authentication schedule as needed.

BACKGROUND INFORMATION

Security, and particularly vehicle security, has long been a concern for users and owners of vehicles. With the development of electronic and processor-based vehicle entry and ignition systems, conventional vehicle security systems have provided adequate, albeit minimal, protection. In the last decade, conventional "key and lock" systems have been augmented with remote access in which users are able to open their vehicles remotely by pressing a button on their key fobs. In these systems, the authorization to drive is mainly enforced by a physical key and lock system. Physical keys may contain embedded immobilizer chips to prevent key copying. Recently, car manufacturers have introduced Passive Keyless Entry and Start (PKES) systems (sometimes referred to in the art as "smart key" systems) that allow users to open and start their cars without requiring a physical key. This feature is very convenient for the users since they don't have to search for their keys when approaching or preparing to start the car.

PKES systems are typically configured to automatically unlock a vehicle when the user carrying the key approaches the vehicle, and locks the vehicle when the user moves away from the vehicle. The system is referred to as "passive" as it does not require any action from the user. The communication between the key and car is characterized by a magnetically coupled radio frequency signal. In this system, the vehicle determines that the key is in the close proximity when it is within the vehicle's communication range. A PKES key typically relies on a low-frequency radio-frequency identification (LF RFID) tag that provides short range communication (e.g., within 1-2 m in active, and a few centimeters in passive mode) and a ultra-high frequency (UHF) transceiver for longer range communication (within 10 to 100 m). This configuration is used to detect if the key fob is within regions inside and outside of the vehicle. For remote distance regions (e.g., up to 100 m), only locking/opening the vehicle by pushing a button on the key fob is allowed. For close proximity regions (e.g., 1-2 m from the door handle), opening/closing the vehicle, by using the door handle, is allowed. For regions inside the vehicle, starting the engine is allowed.

One problem with such conventional systems is that the PKES systems have been shown to be vulnerable to hacking. For example, the relay attack is a well-known attack against communications systems, where messages are relayed from one location to another in order to make one entity appear closer to the other. In the area of RFID and vehicle systems, a relay attack may comprise an attack on the physical layer by relaying LF signals from the vehicle over an RF link comprising an emitter and receiver. The emitter captures the LF signal and up-converts it to 2.5 GHz. The obtained 2.5 GHz signal is then amplified and transmitted over the air. The receiver part of the link receives this signal and down-converts it to obtain the original LF signal. This LF signal is then amplified again and sent to a loop LF antenna which reproduces the signal that was emitted by the car, allowing the opening and starting the engine of the car.

While certain solutions, such as adding various level of encryption to the signal have been proposed, these solutions are overly complex for implementation within a vehicle system, and require continuous updating to ensure that encryption keys retain their integrity and are properly matched. Furthermore, conventional security and authentication techniques do not adequately take into consideration the behavioral patterns or schedules of users with respect to their vehicles. What is needed is a system that provides vehicle authentication in an effective and simplified manner that also considers behavioral and/or scheduling characteristics of a vehicle's user.

SUMMARY

Various apparatus, systems and methods are disclosed for providing authentication and security reporting for a vehicle. In certain exemplary embodiments, systems for vehicle authentication is disclosed, where one exemplary system comprises a communications interface for receiving a vehicle event signal, where the vehicle event signal includes information regarding at least one of (i) a door lock condition and (ii) an operating condition of a vehicle. The system further comprises storage, operatively coupled to the communications interface, where the storage is configured to store the vehicle event signal along with a vehicle event schedule and at least one authentication rule. A processor, operatively coupled to the communications interface and storage, may be configured to determine if the vehicle event signal is compliant with the vehicle event schedule based on the at least one authentication rule, wherein the processor may be configured to flag the vehicle event as potentially unauthorized if the signal is not compliant, and generate an authentication request, requiring a predetermined response, for transmission from the communications interface.

In other exemplary embodiments, methods for multi-step authentication for a vehicle is disclosed, where one exemplary method comprises the steps of receiving first authentication data and second authentication data via a communications interface in the vehicle, wherein the first authentication data is used for controlling at least one of vehicle access and vehicle operation for the vehicle. The method further comprises generating a vehicle event signal in a processor of the vehicle, where vehicle event signal comprises information regarding at least one of a door lock condition and operating condition of the vehicle. The vehicle event signal may be transmitted via the communications interface, and an authentication request signal may be received in response to the vehicle event signal. The first authentication data may be disabled, using the processor, in response to receiving the authentication request signal, and the second authentication data may be assigned for use in controlling the at least one of vehicle access and vehicle operation for the vehicle.

In still further exemplary embodiments, processor-based methods are disclosed for performing vehicle authentication, where one exemplary method comprises the steps of receiving a vehicle event signal at a communications interface, where the vehicle event signal comprises information regarding at least one of (i) a door lock condition and (ii) an operating condition of a vehicle. A vehicle event schedule and at least one authentication rule may be accessed and it may be determined if the received vehicle event signal is compliant with the vehicle event schedule based on the at least one authentication rule. If the vehicle event signal is not compliant, it may be flagged as being potentially unauthorized. An authentication request may then be generated, requiring a predetermined response, for transmission to the vehicle from the communications interface.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Various embodiments will be described herein below with reference to the accompanying drawings. In the following description, well-known functions or constructions are not described in detail since they may obscure the invention in unnecessary detail.

Figure 1:
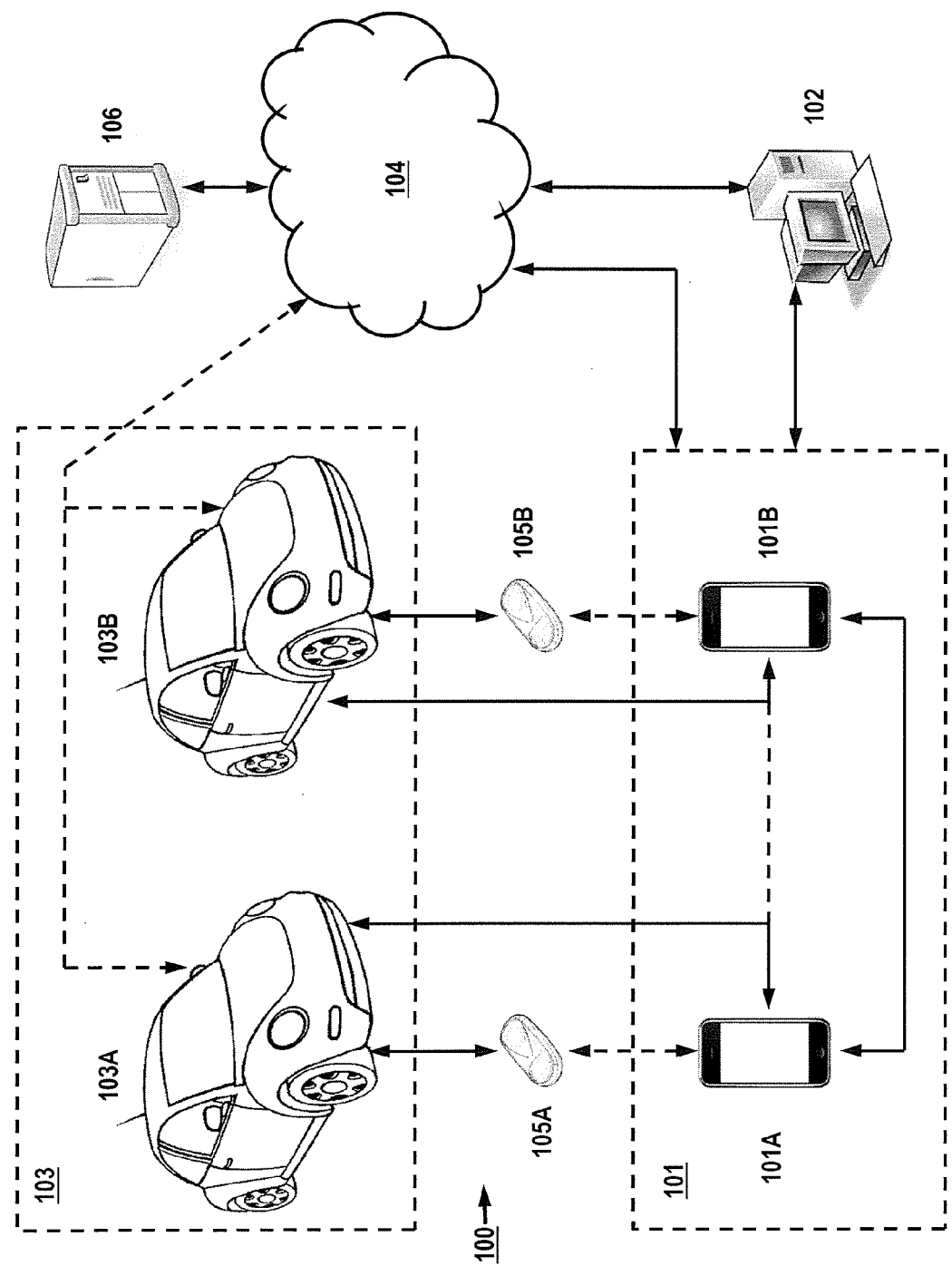
FIG. 1 is an exemplary system illustrating vehicles paired with one or more portable devices and key fobs, wherein the portable devices are configured to communicate with a local computer and network for receiving and sending data and/or instructions.

FIG. 1 discloses an exemplary embodiment of a vehicle authentication system 100, in which vehicles (103A-103B) and their respective key fobs (105A-105B) are paired or linked with respective portable devices (101A-101B), which are configured to communicate with a local computer 102 as well as directly via wireless communication to authentication network 104, which may comprise one or more servers 106. Servers 106 may comprise wired and/or wireless communication interfaces to receive vehicle event data, portable device data and other data from portable devices 101A-B as well as vehicles 103A-B. Additional data or instructions from computer 102 may be received via wired interface through network 104. While not explicitly shown in FIG. 1, servers 106 further comprise processors, storage and other peripheral devices known in the art to enable data processing and communication. For the purposes of the present disclosure, portable devices 101A-101B may include any portable computing device capable of providing data communication over a wireless medium, including, but not limited to, a cellular phone, smart phone, tablet, laptop or PDA.

In the example of FIG. 1, vehicle 103A is linked to key fob 105A, which may be configured to open or start vehicle 103A. Key fob 105A may additionally be equipped with buttons (which may be luminous), other lights, and/or a keypad. Vehicle 103A may also be configured to be linked or paired with portable device 101 A, belonging to a first user. After being paired with vehicle 103A (discussed in greater detail below in FIG. 3), portable device 101A will be able to receive and transmit data and/or instructions to vehicle 103A. The pairing of device 101A with vehicle 103A may be accomplished using any of a number of wireless communication protocols, including IEEE 802.15.4, Bluetooth, Wi-Fi, and NFC. In one exemplary embodiment, portable device 101A may also be linked with key fob 105A to provide a path for wireless data communication as well.

Vehicle 103B is linked to key fob 105B and device 101B belonging to a second user, similarly as described above. In this example, vehicles 103A and 103B may each be considered part of authenticated group 101, 103 linked to users of portable devices 101A-101B, which may be family members, co-workers and the like. Once registered as such (discussed in greater detail in FIG. 3 below), devices 101A-101B may exchange data and/or instructions with each other (indicated by dashed line in FIG. 1), as well as vehicles 103A-103B of the authenticated group. Thus, portable device 101A would be configured to communicate with vehicle 103A and 103B as well as portable device 101B, while portable device 101B would be configured to communicate with vehicle 103B and 103A, as well as portable device 101A. This embodiment may be advantageously used to allow multiple members to communicate with and/or control multiple vehicles within their authentication group, and further allowing data to be communicated to or from portable devices in a group 101 independently, in parallel, or in a "daisy-chain" fashion.

Portable devices 101A-101B may also be communicatively coupled to local computer 102, which may be located at a user's home, place of work, etc. Local computer 102 may be a personal computer, laptop, or any other computing device capable of sending and receiving data communication. In one embodiment, portable devices 101A-101B communicates with local computer 102 wirelessly. In another embodiment portable devices 101A-101B communicate with local computer 102 via a wired connection, which may include a dock or docking station (not shown). Local computer 102 may be suitably equipped with software allowing computer 102 to communicate with authentication network 104, which may include one or more servers 106. In one embodiment, local computer 102 communicates to authentication network 104 via HTTP over TCP/IP using a web browser interface using Java, JavaScript, DHTML, HTML5, Flash, Silverlight or any other suitable language.

Portable devices 101A-101B may also be configured to directly communicate with authentication network 104 via wireless and/or cellular connection as shown in FIG. 1 utilizing an on-device software application (or "app"), or through a web-based or mobile browser. In another exemplary embodiment, vehicles 103A-103B may be equipped with wireless communication to enable vehicles 103A-103B to also communicate wirelessly with authentication network, similar to portable devices 101A-101B.

Vehicle authentication system 100 is configured to provide two-step or multi-step authentication for allowing entry and/ or operation of vehicles 103A and/or 103B. Two-step authentication (also known as two-step verification) is a process involving two or more stages to verify the identity of an entity trying to access a vehicle. Generally speaking, the process involves multi-factor authentication which involves the presentation of two or more of three authentication factors: a possession factor, a knowledge factor and an inheritance factor. When accessing a vehicle, system 100 may execute a form of two-step verification. To determine who the individual is when accessing vehicle 103A, system may require the detection of a key fob 105A to show the individual has possession of a required item. In one embodiment, the system may alternately, or in addition, require the presence ("possession") of portable device 101 A that is registered in the system. To further verify that the individual is authorized to access vehicle 103A, the individual may be required to enter a personal identification number (PIN) ("knowledge factor") on a door lock keypad on the surface of the vehicle door. In one embodiment, the individual may be required to enter a PIN on the portable device 101A, which is then communicated to vehicle 103A and/or authentication network 104. In another embodiment, the individual may be required to physically press a button or series of buttons on key fob 105A for entering a PIN or authentication input. Accordingly, if a vehicle system security is remotely hacked by a thief, entry and/or operation will not be enabled without physical possession of key fob 105A and/or portable device 101A. Furthermore, if a potential thief is in possession of key fob 105A, entry and/or operation of vehicle 103A may be denied if the potential thief does not know the PIN, or is not also simultaneously in possession of the portable device 101 A. In one embodiment, inheritance factors may be utilized via the portable device 101A utilizing fingerprint or voice recognition embodied on the device itself.

Figure 2:
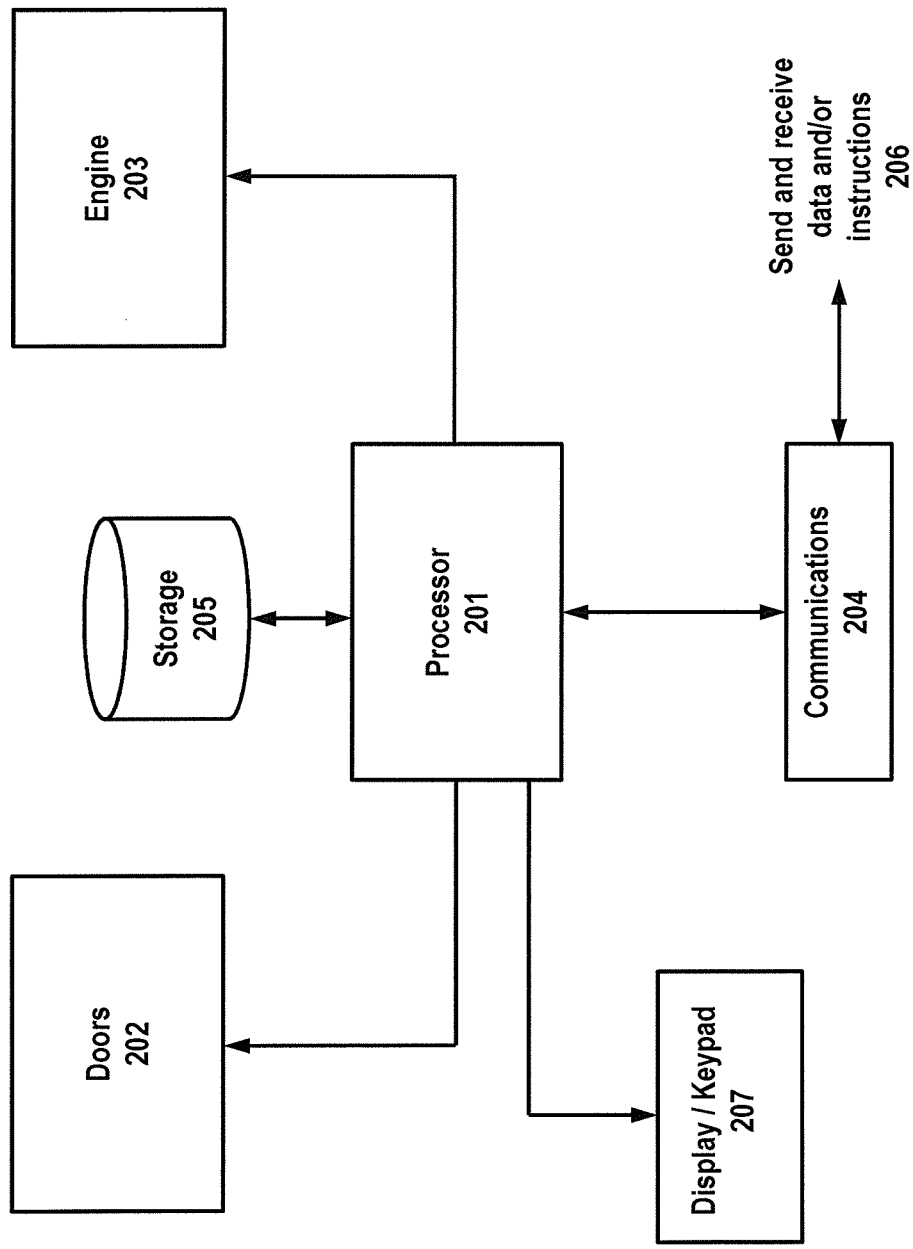
FIG. 2 is an exemplary block diagram illustrating hardware components in a vehicle's electronics system, where a processor communicates and controls operation of door entry and ignition of a vehicle, and includes communications to send and receive data and/or instructions to the vehicle.

Turning to FIG. 2, an exemplary embodiment is provided illustrating components within a vehicle (103A-103B) for authentication. Processor 201 is responsible for operating and controlling doors 202 and associated locking mechanisms, as well as engine 203 operations and control. In one embodiment, processor 201 may be a stand-alone processor that communicates an controls a body controller in the vehicle to lock and unlock the doors 202, and further communicates with an immobilizer or engine control unit (ECU) for controlling operation of the vehicle. In another embodiment, processor 201 may be two or more processors performing the same functions. In this example, the processors may be distributed among different units in the vehicle. The immobilizer may be embodied as static codes or rolling codes in a key fob or portable device that are recognized by an RFID loop around the lock barrel and checked against the vehicle's ECU for a match. If the code is not recognized, the ECU will not allow fuel to flow and ignition to take place. A circuit inside the key fob or portable device is activated by a small electromagnetic field which induces current to flow, which in turn broadcasts a unique binary code which is read by the vehicle's ECU. When the ECU determines that the coded key is both current and valid, the ECU activates the fuel-injection sequence.

Processor 201 is communicatively coupled to communications 204, which may comprise one or more communication interfaces and associated circuitry for sending and receiving data and/or instructions 206 from one or more portable devices and/or an authentication network. Communications 204 may include wired interfaces, such as USB or Firewire, as well as wireless interfaces, such as Bluetooth, Wi-Fi or cellular communication. Processor 201 is also coupled to storage 205 that may be configured to store software for executing authentication described herein, and also store data generated and/or received during the authentication process. Display/keypad 207 is further provided to display information from processor 201 and to provide data entry capabilities for a user. The keypad my comprise a physical keypad, or may alternately be configured as a virtual keypad within the display as is known in the art.

Figure 3:
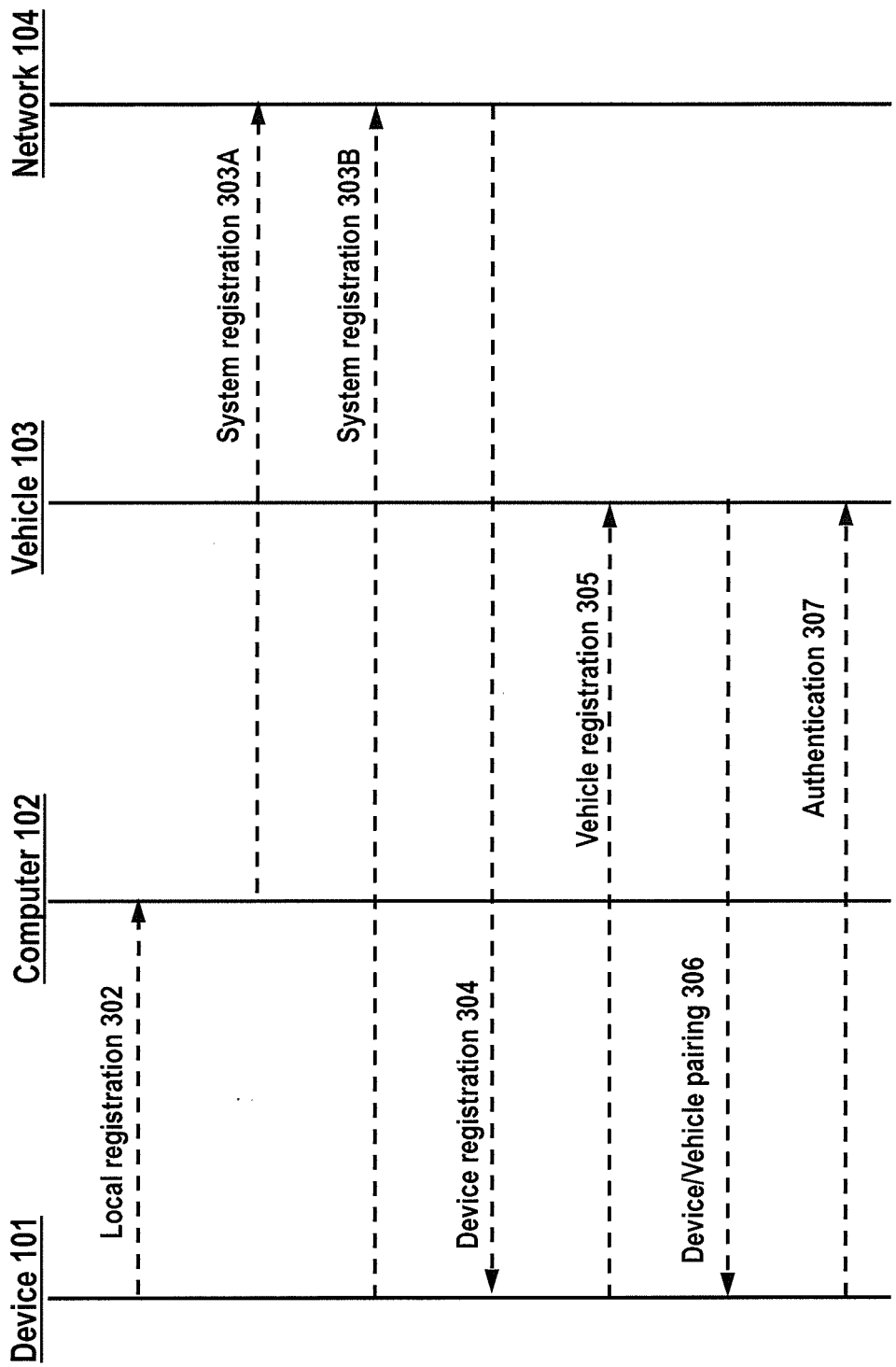
FIG. 3 is an exemplary flow diagram for registering and pairing a portable device with a vehicle and to an authentication network.

FIG. 3 is an exemplary flow diagram illustrating a registration process for a portable device 101 with authentication network 104 and vehicle 103. In this example, registration of portable device 101 further includes the incorporation of local computer 102. For the flowchart examples of FIG. 3-4B, portable device 101 may be any of portable devices 101A-101B, while vehicle 103 may be any of vehicles 103A-103B described above in connection with FIG. 1. The configuration of FIG. 3 may be advantageous in cases where vehicle 103 is equipped with short-range wireless communication (e.g., NFC, Bluetooth, Wi-Fi), but does not have long-range wireless communication (e.g., cellular) that would allow vehicle 103 to directly communicate with authentication network 104.

The registration process of FIG. 3 allows users to register themselves and their portable devices with authentication network 104. During the registration process, portable device 101 performs a local registration 302 with computer 102, through a wireless or direct-wired couple. Here, computer 101 can record information regarding portable device 101, including, but not limited to SIM card ID number, International Mobile Equipment Identity (IMEI) number, and Bluetooth address (BD_ADDR). This information may then be stored in computer 102 as an authentication profile for the registering user. In this embodiment, users may manually change or augment the authentication profile at computer 102 using software specifically configured for interaction with device 101 and authentication system 104. For example, users may add or configure devices to be part of an authentication group. Furthermore, users may manually enter modifications to authentication rules (discussed in greater detail below in connection with FIG. 5). The device/user identification and authentication profile are then transmitted from computer 102 to authentication network 104 to initialize system registration 303A.

In one embodiment, the steps of 302 and 303A described above are performed in device 101, utilizing an on-device app, which allows for user registration without the use of computer 102. Here, device/user identification is automatically gathered via the app, or manually entered, wherein the resulting device/user identification and authentication profile are transmitted directly from device 101 to authentication network 104 to initialize system registration 303B. Once registration is received and entered in authentication network 104, device registration 304 is confirmed back to device 101. In one embodiment, device registration 304 may include full activation of authentication software on device 101, and may further include authentication keys, passwords, and/or PIN numbers that may be stored on device 101 and for transmission to vehicle 103.

Continuing with the example of FIG. 3, portable device 101 registers with vehicle 103 in vehicle registration step 305. In one embodiment, portable device 101 registers with vehicle 103 via a wireless initialization process, wherein portable device 101 and vehicle 103 are paired and/or bonded to each other to allow for secure communication. Further details regarding the initialization, securing and pairing/bonding process in one embodiment, disclosed in the context of Bluetooth communication, is discussed below in connection with FIG. 6. It should be understood by those skilled in the art that other wireless protocols may be suitable for securing and pairing device 101 with vehicle 103 as well. Once device 101 and vehicle 103 are paired in 106, they may exchange authentication data and other data, objects and/or executable code.

Figure 6:
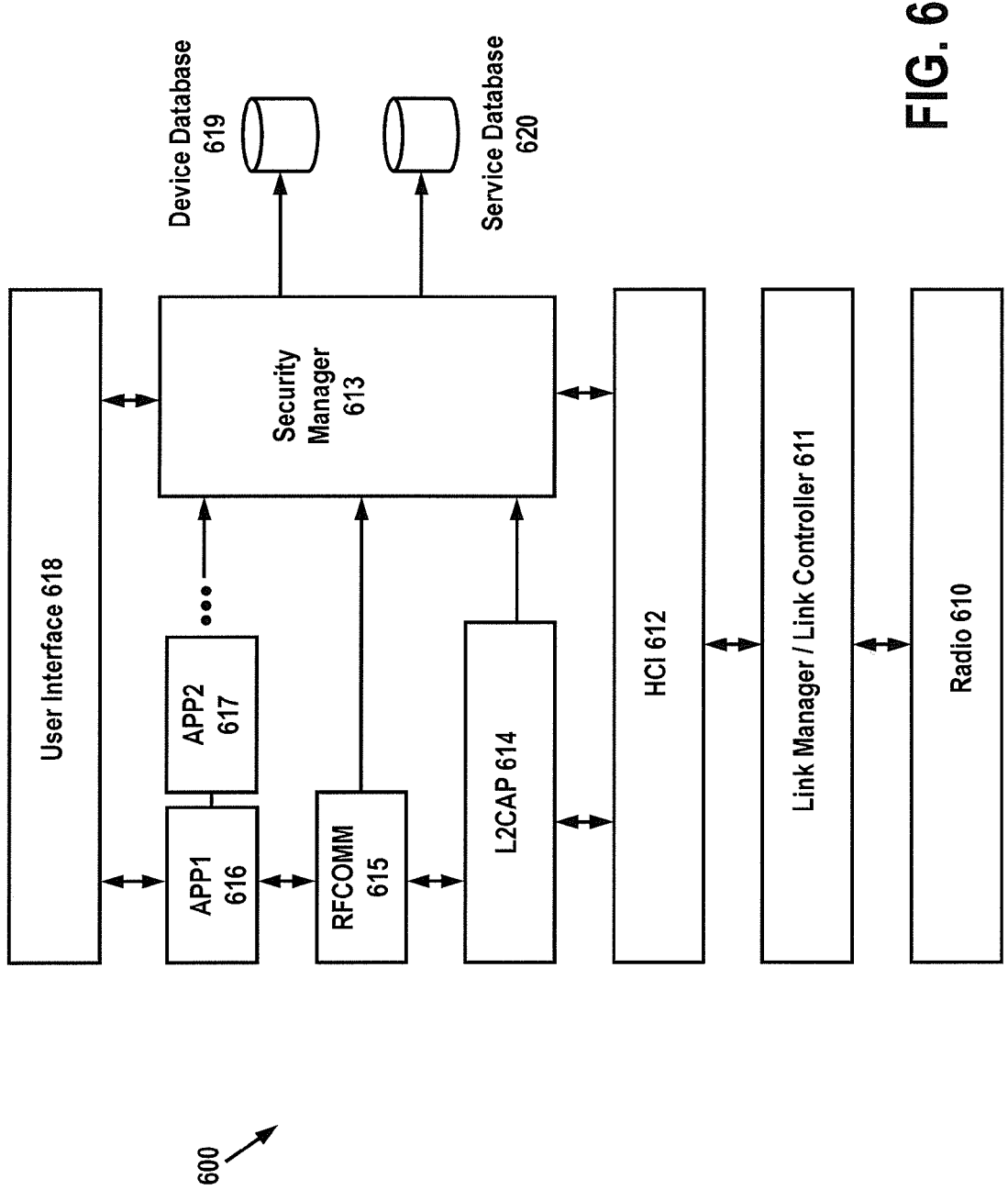
FIG. 6 is an exemplary illustration of a wireless pairing/bonding configuration that further includes protocols for securely pairing/bonding devices and vehicles.

Turning now to FIG. 6, the figure illustrates an exemplary configuration for communication among portable device(s) 101 and vehicle 103 utilizing a Bluetooth protocol. The configuration is particularly useful for pairing and bonding portable devices to vehicle 103 and to each other. Generally speaking, two entities (e.g., device-device; device-vehicle) may become paired when they start with the same PIN and generate the same link key, and then use this key for authenticating at least a present communication session. The session can exist for the life of a L2CAP link or the life of an ACL link. Pairing can occur through an automatic authentication process if both devices already have the same stored PIN from which they can derive the same link keys for authentication. Alternatively, either or both applications can ask their respective users for manual PIN entry. Once entities are paired they can either store their link keys for use in subsequent authentications or discard them and repeat the pairing process each time they connect. If the link keys are stored, then the devices are bonded, enabling future authentications to occur using the same link keys and without requiring the user to input the PIN again. Bonding can expire immediately after the link is disconnected, after a certain time period expires, or never (permanently bonded). When bonding expires, the entities must repeat the pairing process again.

In FIG. 6, an exemplary security management configuration is illustrated, that may be incorporated into a host software package on device(s) 101 and vehicle(s) 103. For greater flexibility, authentication and authorization can occur after determining the security level of the requested authentication service; in this case, authentication occurs after the ACL link is established. Of course, other authentication can occur with initial establishment of the ACL link. In FIG. 6, security manager 613 resides on the Bluetooth host and communicates with L2CAP 614 and with link manager/controller 611 through host control interface 612. Typically, a connect request from a portable device to a vehicle (and vice-versa) arrives at L2CAP 614, where L2CAP requests evaluation from security manager 613. Security manager 613 looks up the requested service in database 620 for security information, and looks the requesting device's BD_ADDR or International Mobile Equipment Identity (IMEI) number in database 619 for access authorizations. Security manager 613 then begins the necessary authentication and (if needed) encryption procedures with the link manager 611 through HCI 612. If authentication is determined to be positive, link manager 611 provides a response through HCI, and L2CAP 614 finishes the connection setup process. The security manager architecture in FIG. 6 could be used to implement link-level (Mode 3) security as well.

The configuration of FIG. 6 may implement basic security operations primarily at the link manager/controller 611 levels. Link controller 611 can implement key-generating algorithms, random number processes, and basic communication of the various security parameters between vehicle 103 and portable device 101. Link manager 211 provides a set of commands that enable the formation of link management protocol packets containing the security parameters. HCI 212 provides a means for the host to communicate security items to the Bluetooth module for use by the link manager controller 211. At the link layer, there may be several different entities used to maintain security. A PIN can be used as either a fixed number, preprogrammed into the Bluetooth unit, or a number that's entered by the user at the beginning of each secure session. There are several ways that a portable device 101 and vehicle 103 (and/or another portable device in an authentication group) can be provided the same PIN: if the portable device and vehicle are being set up to exchange files, then each can ask for a password, in which a common PIN is derived from the link keys. In another embodiment, vehicle 103 may be set up with user authentication profiles comprising a database of BD_ADDR/IMEI values and associated PIN codes. The security manager can enter these via an encrypted Bluetooth link or through an ordinary cable connection. When a device attempts to connect, the application asks for a PIN (or retrieves one that was previously stored), from which the link keys are derived. If the user's PIN matches, then both devices create the same link key and authentication and, if needed, encryption can proceed successfully. Under one embodiment, the PIN may be associated with a user rather than with the device.

An authentication key, which also may operate as a link key, is typically 128 bits long and is used by one device to insure that the other device is who it claims to be. The link key can either be temporary, where it is used for one session only (i.e., devices not bonded), or semi-permanent in which it is stored and used for several sessions or over a time period (i.e., devices bonded). Stored link keys are semi-permanent because they can be either changed or removed at a later time. As a result, paired and/or bonded devices can derive and store a new link key during each session if desired. The link key may be used to generate encryption keys, such as initialization keys, unit keys, combination keys and master keys. An initialization key is used as a link key when two devices first connect. It is normally created only once and used to protect the generation and transfer of other keys that are more secure than the initialization key. A unit key is on that is associated with a single Bluetooth device that has limited resources and can't store a large number of keys. This key is typically generated once and is almost never changed. A combination key is derived from inputs provided by both devices on a Bluetooth link and is considered more secure than a unit key. Unlike unit keys, a combination key is unique to a pair of devices, and not just one device. A master key is temporary and is used for the generation of an encryption key for broadcasting packets to multiple slaves. An encryption key may be used in a streaming algorithm to change plain text into cipher text and vice versa. The key can be as short as 8 bits and as long as 128 bits.

Once portable device 101 and vehicle 103 are paired/bonded, the system may be configured to record events, such as the locking/unlocking, opening/closing of doors, vehicle ignition, engine shut-down, and the like. Utilizing processor 201 and communications 204, vehicle 103 may communicate the events to portable device 101, or directly to authentication system 104. In the exemplary flowchart of FIG. 4A, vehicle 103 registers a first event 311 (e.g., door lock) to device 101. The registration may be in the form of an event code that is capable of identifying an event, together with a time stamp. Once the registered event is received in device 101, it is transmitted as a report in 312 to authentication network 104. The event report is stored and processed in accordance with authentication rules (see ref. 408, FIG. 5) in authentication network 104. If the first event is within the parameters of the authentication rules, acknowledgement 313 regarding the first event is transmitted to device 101. In step 314, a time stamped second event (e.g., door unlock) is registered 314 from vehicle 103 to device 101. Again, device 101 reports the second event 315 to authentication network 104, where the second event is stored and processed in accordance with authentication rules. If the second event is determined to be outside the parameters of the authentication rules, authentication network 104 may flag the vehicle event as being potentially unauthorized and transmits an acknowledgement 316 to device 101, and further transmits an authentication request instruction 317 to portable device 101, which may automatically be transmitted to vehicle 103 as a request for authentication 318. Vehicle 103 responds to device 101 with an authentication challenge 319 requesting entry of a security code or PIN. The response 320 from device 101 is sent back to vehicle 103 for authentication. In certain embodiments, response 320 may be in the form of a vehicle door keypad entry or a key fob entry, instead of device 101. If the response is determined as valid, the flag may be removed.

Figure 4A:
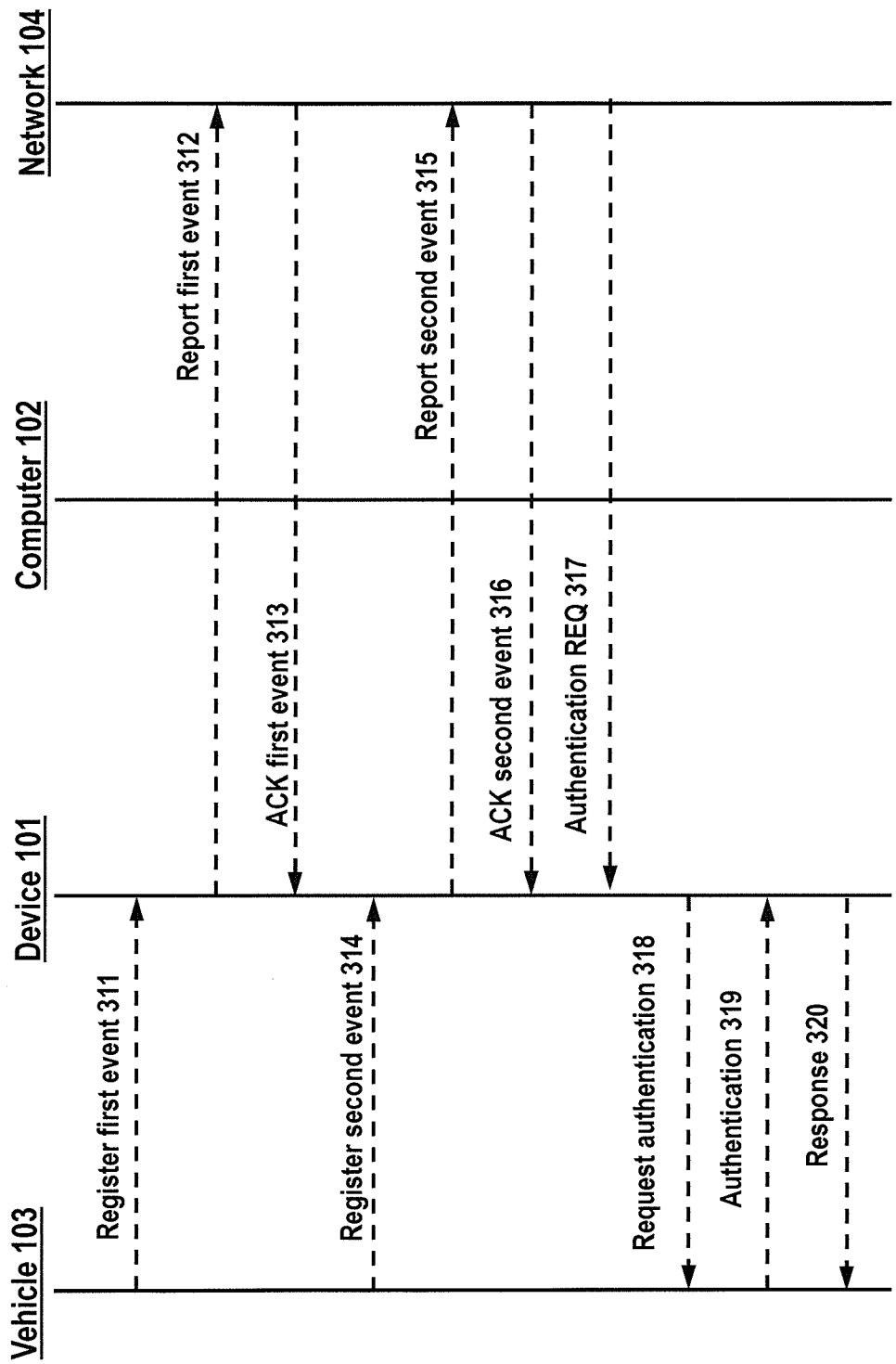
FIG. 4A is one exemplary flow diagram for registering events in a portable device, where the portable device reports events to an authentication network that is configured to acknowledge events pack to the portable device and computer, and to initialize an authentication process.

The exemplary embodiment of FIG. 4A is arranged to communicate events from vehicle 103 to authentication network 104 using portable device 101 as an intermediary communications link. As discussed above, such a configuration may be advantageous when vehicle 103 does not have its own long-range (cellular) communication capabilities. In one embodiment, the registering of events from vehicle 103 to portable device 101 (311, 314), as well as the acknowledgement of events from network 104 to portable device 101 (313, 316) may occur transparently to the user of portable device 101. In other words, the events will be registered/acknowledged as data within device 101 without the user's knowledge. In another embodiment, portable device 101 may be set to an "alert" mode, which would result in a visual and/or audio indication of the occurring event on portable device 101. For example, if device 101 is set to an alert mode, device 101 may display "DOOR LOCKED" or "DOOR UNLOCKED" on the screen of device 101 upon the registration or acknowledgement of each respective event. Further audio alerts may be used in addition to, or instead of, visual alerts.

Additionally, the pairing/bonding of portable device 101 allows it to forward PINs or passwords, which may be received from authentication network 104 or internally generated on portable device 101, to vehicle 103. In one embodiment, PINs and/or passwords are provided as primary and secondary PINs/passwords. Both are preferably stored in vehicle 103 and portable device 101. Authentication for access to vehicle 103 may initially be dependent upon the entry of the primary PIN/password. If a vehicle event triggers the authentication network to request further authentication, the primary PIN/password is disabled in the vehicle, and the secondary PIN/password now becomes the primary PIN/password necessary for gaining access to vehicle 103. Such a configuration is advantageous in cases where the initial PIN/password is hacked. Since the secondary password is stored, but has not been entered by a user, the hacker would not be able to acquire both passwords without accessing the memories of portable device 101 and/or vehicle 103. If the PIN/password is entered correctly, authentication system 104 or portable device 101 generates a new secondary password for vehicle 103. Just as before, if further authentication is required at a future time, the (new) primary PIN/password is disabled and the new secondary PIN/password becomes the primary password. In this manner, primary and secondary PINs/passwords may be efficiently cycled so that compromised PINs/passwords may be quickly changed.

Figure 4B:
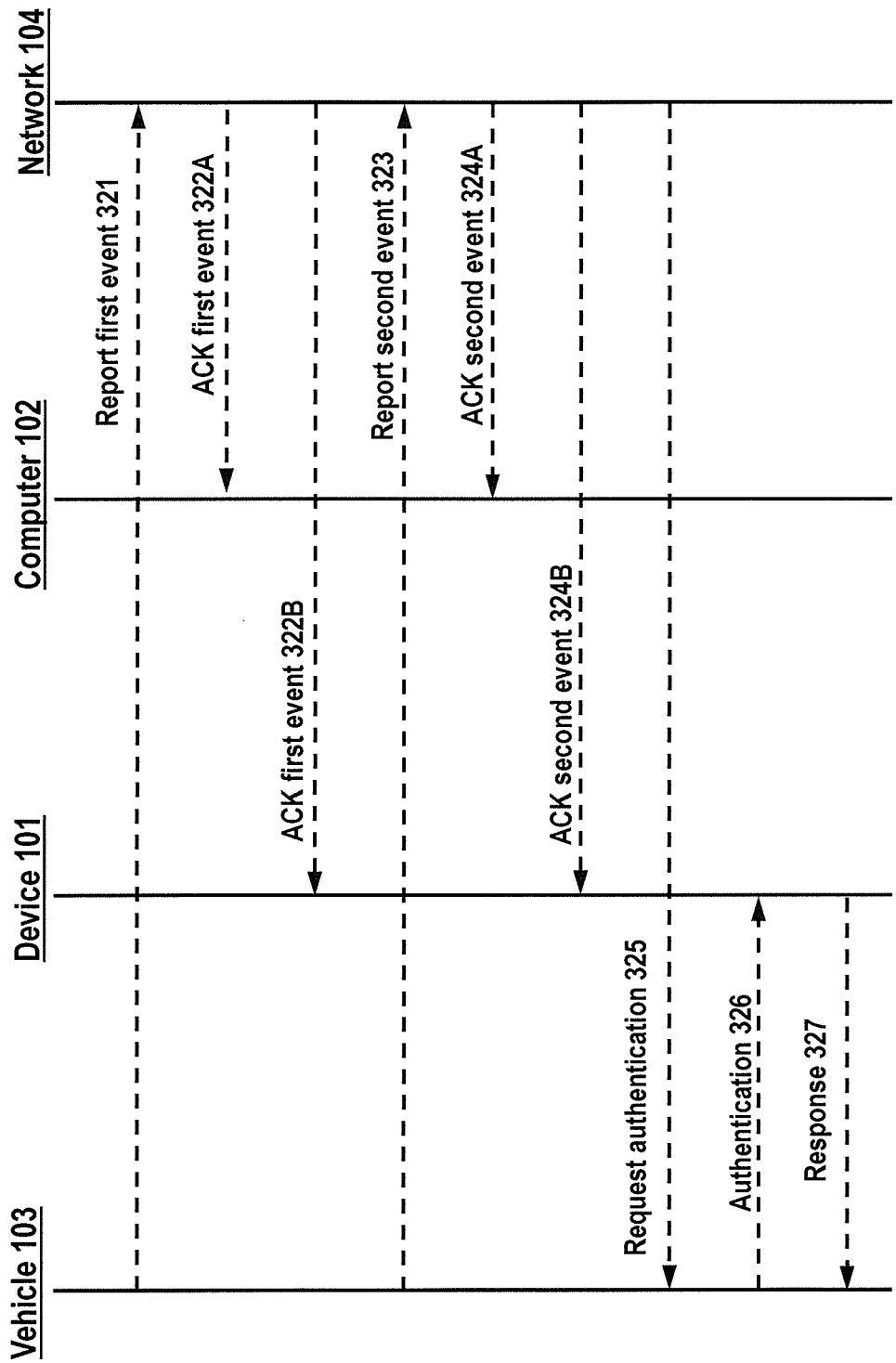
FIG. 4B is another exemplary flow diagram for registering events directly to an authentication network that is configured to acknowledge events back to a portable device and a computer, where the authentication network is further configured to initialize an authentication process.

Turning now to FIG. 4B, another exemplary embodiment is provided where, unlike the embodiment of FIG. 4A, vehicle 103 of FIG. 4B is equipped with cellular communication, or other suitable types of communication, for directly connecting with authentication network 104. Just as above, authentication network 104 may be configured to forward primary and secondary PINs/passwords to vehicle 103 for authentication. In FIG. 4B, a first (time stamped) event occurring on vehicle 103 is reported in 321 to network 104 and is stored and processed in accordance with authentication rules. In this example, the first event is acknowledged in 322A to computer 102 and further acknowledged in 322B to portable device 101. A second (time stamped) event occurring on vehicle 103 is reported 323 to authentication network 104 and is processed in accordance with authentication rules and is also acknowledged in 324A to computer 102 and further acknowledged in 324B to portable device 101. If the second event is determined to be outside the parameters of the authentication rules, authentication network 104 may flag the vehicle event as being potentially unauthorized and transmits an authentication request instruction 325 to vehicle 103 to initiate authentication. Vehicle 103 responds by communicating to device 101 with an authentication challenge 326 requesting entry of a security code or PIN. The response 327 from device 101 is sent back to vehicle 103 for authentication. In certain embodiments, response 327 may be in the form of a vehicle door keypad entry or a key fob entry, instead of device 101. If the response if determined as valid, the flag may be removed.

In the embodiment of FIG. 4B, acknowledgements (322A-B; 324A-B) from authentication network 104 may be used by either or both of portable device 101 and computer 102 to monitor vehicle events using the alert mode discussed above. Such a configuration is particularly advantageous since it allows device 101 and/or computer 102 to remotely inform a user of potentially unauthorized events that were not known, or not processed correctly, in the authentication rules of network 104. In one embodiment, either of portable device 101 or computer 102 may be equipped with a "panic" feature that allows either device to alert authentication network 104 of unauthorized use, which may be used to communicate the unauthorized use to the police, or to remotely disable operation of vehicle 103.

It should be understood by those skilled in the art that other configurations are contemplated in the present disclosure with respect to the embodiments of 4A-4B. For example, instead of registering and reporting vehicle events sequentially, events may be "batched" so that they may be registered and collectively reported as groups of events. Furthermore, portable devices may be registered with multiple vehicles, thus allowing events from multiple vehicles to be reported to a single device. Moreover, as portable devices may be paired/bonded to each other, event data may be forwarded from one device to another.

Figure 5:
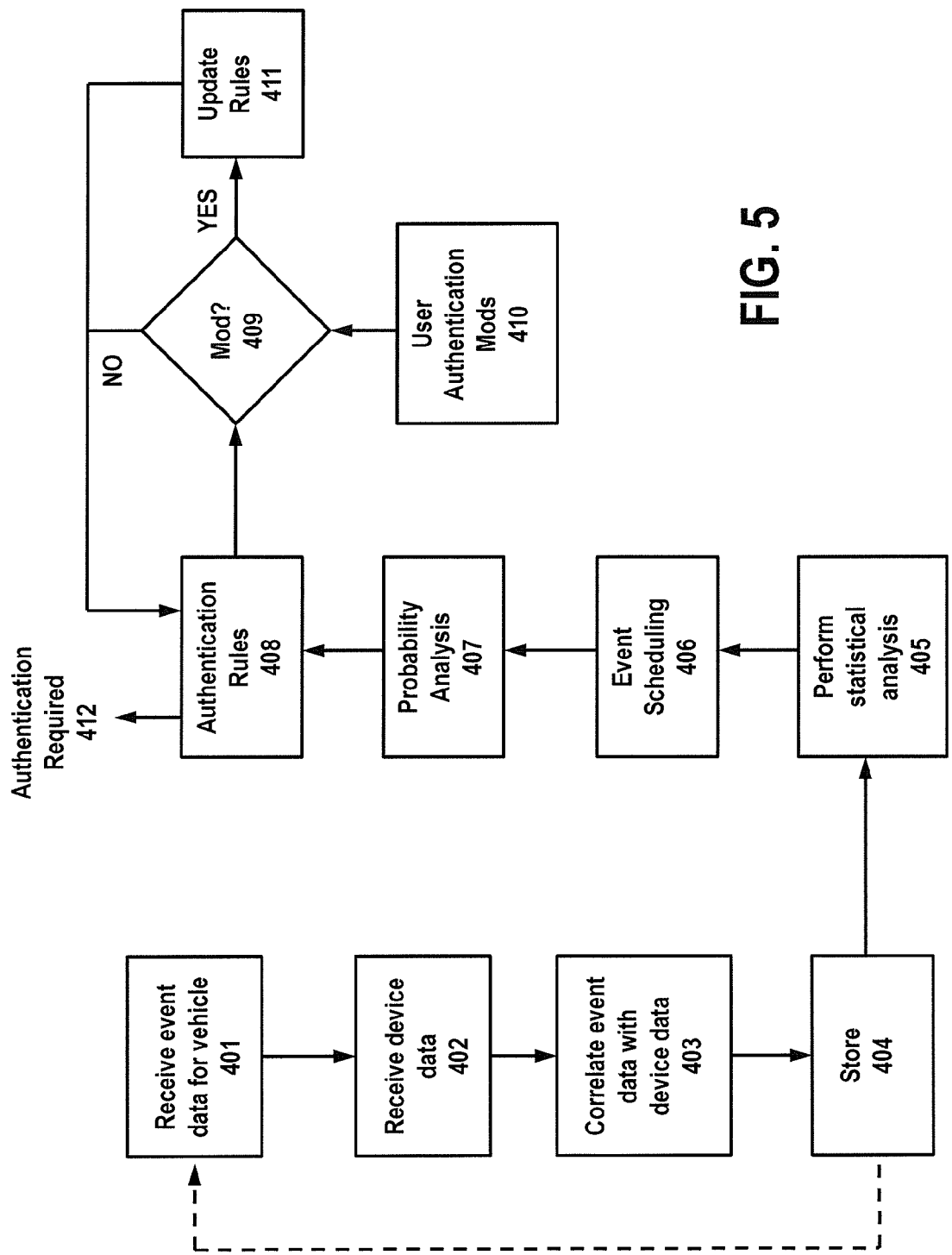
FIG. 5 is an exemplary flow diagram for receiving, processing and managing data in an authentication system, where authentication modifications may be added by users.

Turning to FIG. 5, a flow diagram is provided to illustrate one exemplary configuration for processing vehicle event data in the authentication network 104. The processing of FIG. 5 may be performed by one or more servers (e.g., ref 106, FIG. 1) of authentication network 104, where the server(s) receive event data, portable device data and other data via one or more wireless and wired interfaces from one or more devices, computers and/or vehicles. The exemplary process of FIG. 5 begins with the receipt of vehicle event data 401 (e.g., door unlocked, vehicle start, etc.), along with the receipt of portable device data 402. In step 402, portable device data may include such information as GPS data, MAC address, wireless access point (WAP), SIM card ID number, IMEI number, BD_ADDR, etc. Portable device data 402 may be collected concurrently with vehicle event data, or may be collected separately. In step 403 vehicle event data is correlated with portable device data and stored 404. Here, the portable device data may be used to supplement vehicle event data to provide more information for authentication rules. For example, a portable device's GPS coordinates may be tracked over a given period of time to determine and map common travel paths for a user. Similarly, GPS coordinates that tend to be more static indicate areas of interest in which the user spends extended periods of time. Examples of such areas include a user's home, the user's office, homes of the user's friends/relatives, schools, or commercial establishments frequented by the user. A region surrounding the areas of interest may be designated by the authentication system as "hot" spots that incorporate a first level of authentication. This first level of authentication may require a lower level of authentication. In one embodiment, frequented locations may be individually labeled (e.g., "home", "work", "mother's house", etc.), where each location is assigned a different level of authentication.

After data is stored in 404, the process may revert back to 401 to continue receiving/correlating vehicle event data and portable device data. In step 405, statistical analysis is performed on the event data and/or portable device data to determine event scheduling 406. In this example, event scheduling 406 is a process in which the authentication system "learns" a user's behavior or schedule. As more vehicle and/or portable device data is collected, the authentication system is capable of generating more robust authentication rules (408). The statistical analysis of 405 may be based on vehicle event data alone, or may further include portable device data together with vehicle event data. In one embodiment, statistical analysis may be based on analyzing vehicle event data and/or portable device data to derive a normal or Gaussian distribution. The mean (or average) and the standard deviations may then be determined from the data for setting up event scheduling, and further may be used for setting up and/or modifying authentication rules 408. The mean and standard deviation of the data sets may be determined using Fisher's exact test, t-test and regression/correlation analysis known in the art. Of course other suitable statistical processing techniques may be used, depending on the needs of the authentication system designer, to analyze vehicle and portable device data, including, but not limited to, time series analysis, factor analysis, analysis of variance (ANOVA). mean square weighted deviation, chi-squared test and Spearman's rank correlation coefficient.

Once statistical analysis 405 is performed, event scheduling 406 determines one or more vehicle event patterns (and/or portable device patters) deemed to be "normal" for the purposes of authentication rules 408. Vehicle events, which may be considered with portable device data, determined to be outside the normal parameters of authentication rules 408 would trigger an authentication request requiring further input from the user. In one embodiment, probability analysis 407 may be performed on incoming vehicle event and/or portable device data to determine if the incoming information is in compliance with event scheduling 406 for the purposes of authentication rules 408. This embodiment may be advantageous for automatically adjusting the sensitivity of authentication rules so that discrete or continuous events and data may be accounted for so that excessive authentication requests may be avoided. The probability analysis may be performed using discrete probability distribution models, continuous probability distribution models and/or measure theoretic probability models. Of course other suitable probability models known in the art may be used depending on the needs of the authentication system designer.

As authentication rules 408 are set up and updated using any of the data from 405-407, authentication rules may be manually modified as well. In this embodiment, users are able to input user authentication modification from 410. These user modifications may be entered from device 101, or may be entered from computer 102, preferably though a web portal communicatively coupled to the authentication network. In this example, users may specify a "lock out" mode for the vehicle for a given period of time. Such a configuration may be advantageous for cases where a user will be physically away from the vehicle for an extended period of time. For example, if a user is planning to travel, and knows in advance that the vehicle will be dormant in an airport parking lot, the user may specify from computer 102 or portable device 101 that the vehicle is to be disabled between certain periods of time. Once the vehicle is locked out, any access to the vehicle, other than through the user's key fob or portable device, will be denied. Alternately, the user may grant access privileges to other users having portable devices or key fobs registered with the vehicle. In another example, a user may specify via computer 102 or portable device 101 that a vehicle is to be locked out between 12:00 AM and 5:00 AM on weekdays and/or weekends.

If the authentication rules determine that modifications were made in 409, the rules are updated in 411, and used in 408. If no modifications are present in 409, the modifications continue as they were in 408. As incoming events and/or portable device data is received in authentication system 104, they are compared to normal values determined for authentication rules 208. The comparison to the authentication rules may comprise a comparison of whether the vehicle event occurred during a time period determined to be normal for the user's event schedule. In one embodiment, the comparison may comprise a probabilistic determination (407) whether a vehicle event is likely to have occurred during a normal event schedule. In another embodiment, the comparison may include a vehicle even, in light of the user's event schedule, taken together with portable device data (e.g., location of portable device, presence of portable device near vehicle at the time of vehicle event, etc.). In another embodiment a probabilistic determination of whether a vehicle event is likely to have occurred during a normal event schedule in light of the portable device data. If a specific incoming event and/or portable device data, or probabilistic analysis thereof, is determined to be outside one or more normal values, the vehicle event is preliminarily flagged as being unauthorized, and an authentication request signal 412 is transmitted, requiring further input from a user.

It should be understood by those skilled in the art that the described function and operation of authentication network 104 is not limited simply to a network, and that an "authentication network" may be embodied as a stand-alone server or even a computer workstation that is configured to communicate with devices 101 and vehicles 103. In one exemplary embodiment, an authentication network may even be embodied within a processor of a vehicle (FIG. 2), allowing the vehicle to perform authentication without requiring communication with an external network or server. In another exemplary embodiment, the external network or server may simply "push" hundreds or thousands of PINs and/or passwords to the vehicle processor, allowing it to cycle PINs/passwords (discussed above in FIGS. 4A-B) for months or even years.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system for vehicle authentication, comprising:
a communications interface for receiving a vehicle event signal, said vehicle event signal comprising information regarding a vehicle event comprising at least one of (i) a door lock condition and (ii) an operating condition of a vehicle;
a storage, operatively coupled to the communications interface, said storage being configured to store a vehicle event schedule and at least one authentication rule, said storage being further configured to store the vehicle event signal; and
a processor, operatively coupled to the communications interface and storage, wherein the processor is configured to determine when the vehicle event signal is compliant and when the vehicle event signal is not compliant with the vehicle event schedule based on the at least one authentication rule,
wherein the processor is further configured to flag the vehicle event as potentially unauthorized when the signal is not compliant, and generate an authentication request, requiring a predetermined response, for transmission from the communications interface in order to execute the vehicle event.

2. The system of claim 1, wherein the vehicle event schedule comprises a plurality of previously received event signals recorded over a predetermined period of time.

3. The system of claim 1, wherein the at least one authentication rule comprises at least one parameter for determining compliance with the vehicle event schedule.

4. The system of claim 1, wherein the system is further configured to receive, via the communications interface, portable device data comprising information regarding an operating characteristic of a portable device registered to the vehicle,
and wherein the at least one authentication rule further comprises portable device data parameters.

5. The system of claim 4, wherein the processor is further configured to determine if the received vehicle event signal is compliant by comparing the received portable device data to the portable device parameters.

6. The system of claim 4, wherein the portable device data comprises at least one of global positioning system (GPS) data, a media access control (MAC) address, a wireless access point (WAP), a subscriber identity module (SIM) card identification number, an international mobile equipment identity (IMEI) number, and a Bluetooth address (BD_ADDR).

7. The system of claim 1, wherein the communications interface is configured to receive authentication data in response to the authentication request signal, wherein the processor is configured to remove the flag if the authentication data matches the predetermined response.

8. A processor-based method for performing vehicle authentication, comprising the steps of:
receiving a vehicle event signal at a communications interface, said vehicle event signal comprising information regarding a vehicle event comprising at least one of (i) a door lock condition and (ii) an operating condition of a vehicle;
accessing a vehicle event schedule and at least one authentication rule; and
determining when the received vehicle event signal is compliant and when the received vehicle event signal is not compliant with the vehicle event schedule based on the at least one authentication rule;
flagging the vehicle event as potentially unauthorized when the signal is not compliant; and
generating an authentication request, requiring a predetermined response, for transmission to the vehicle from the communications interface in order to execute the vehicle event.

9. The processor-based method of claim 8, wherein the vehicle event schedule comprises a plurality of previously received event signals recorded over a predetermined period of time.

10. The processor-based method of claim 8, wherein the at least one authentication rule comprises at least one parameter for determining compliance with the vehicle event schedule.

11. The processor-based method of claim 8, further comprising the steps of receiving, via the communications interface, portable device data comprising information regarding an operating characteristic of a portable device registered to the vehicle, wherein the at least one authentication rule further comprises portable device data parameters.

12. The processor-based method of claim 11, further comprising the steps of determining if the received vehicle event signal is compliant by comparing the received portable device data to the portable device parameters.

13. The processor-based method of claim 11, wherein the portable device data comprises at least one of global positioning system (GPS) data, a media access control (MAC) address, a wireless access point (WAP), a subscriber identity module (SIM) card identification number, an international mobile equipment identity (IMEI) number, and a Bluetooth address (BD_ADDR).

14. The processor-based method of claim 8, further comprising the steps of receiving authentication data in response to the authentication request signal, and removing the flag if the authentication data matches the predetermined response.

* * * * *